(No Model.)
B. R. EATON.
GIN SAW CLEANER.
No. 301,225. Patented July 1, 1884.
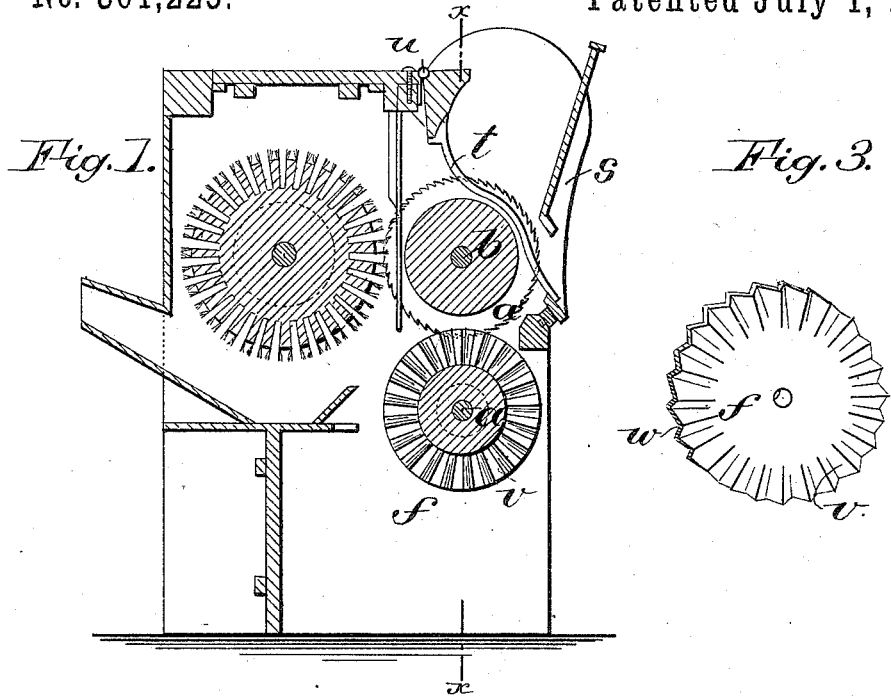
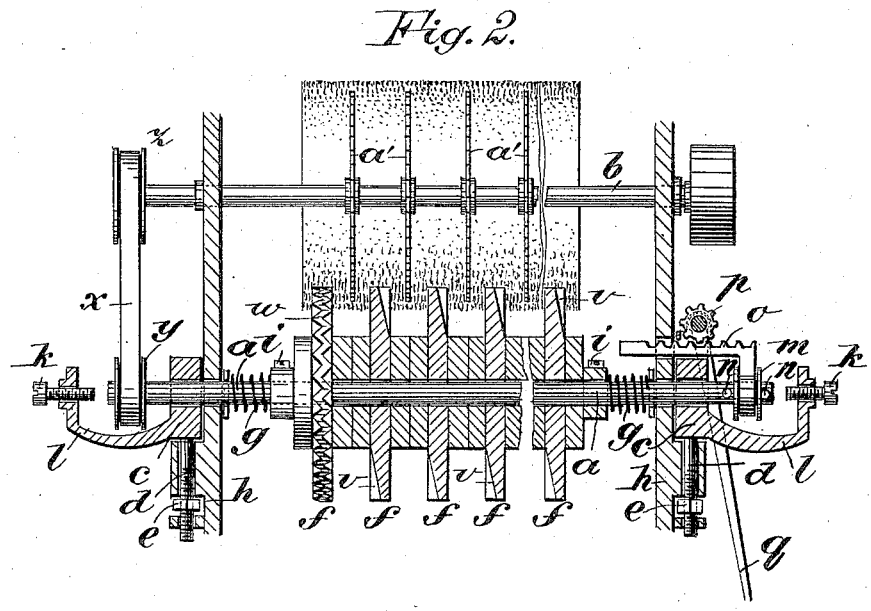
WITNESSES:
INVENTOR:
B. R. Eaton
BY
ATTORNEYS.

United States Patent Office.

BENJAMIN R. EATON, OF MIDDLE SETTLEMENT, ARKANSAS.

GIN-SAW CLEANER.

SPECIFICATION forming part of Letters Patent No. 301,225, dated July 1, 1884.

Application filed October 31, 1883. (No model.)

*To all whom it may concern:*

Be it known that I, BENJAMIN R. EATON, of Middle Settlement, in the county of Van Buren and State of Arkansas, have invented a new and Improved Gin-Saw Cleaner, of which the following is a full, clear, and exact description.

This invention pertains to improvements in gin-saw cleaners; and it consists of the combinations and constructions of parts, substantially as hereinafter fully set forth, and pointed out in the claims.

Reference is to be had to the accompanying drawings, forming part of this specification, in which similar letters of reference indicate corresponding parts in all the figures.

Figure 1 is a sectional elevation of a cotton-gin having my improved saw-cleaner, the section being taken transversely to the saw-shaft. Fig. 2 is a section along the line of the shaft on the line $x\ x$ of Fig. 1, and Fig. 3 is a perspective view of one of the disks of my improved cleaning attachment.

I arrange a shaft or mandrel, $a$, under the saw-arbor $b$ in bearings $c$, in which the said mandrel can shift lengthwise a suitable distance, the said bearings being supported on adjusting-screws $d$, having nuts $e$, by which the mandrel can be leveled properly. On this mandrel I arrange a series of disks, $f$, numbering one more than the number of saws $a'$, and being placed the same distance apart that the saws are, and the mandrel is so placed with relation to the saw-arbor that the disks run at the edges some distance into the spaces between the saws. At each end of the series of disks $f$ the shaft $a$ has a spiral spring, $g$, which bears against the housing $h$ of the frame of the machine, and a collar, $i$, secured on the shaft by a set-screw, the collar being to regulate and equalize the tension of the springs, and the springs being to maintain the disks in the middle space between the saws when not in use for cleaning the saws. At each end of the mandrel $a$ is an adjusting-screw, $k$, to be set so as to stop the lengthwise movements of the mandrel when the disks bear with the requisite pressure on the sides of the saws. These screws $k$ are supported in arms $l$ of the bearings $c$, so as to be set for stops to prevent the mandrel from being shifted too far. The mandrel is connected, by a yoke, $m$, washers, and stop-pins $n$, (or collars and set-screws, if preferred,) with a toothed bar, $o$, with which a pinion, $p$, gears, that is worked by a hand or foot lever, $q$, to be operated by the attendant whenever it is desired to clean the saws.

The breast $s$ and the grate $t$ are to be raised up on the hinges $u$, prior to using the cleaner, to allow the roll to be first unwound. Then the lever $q$ is shifted one way or the other to bring the disks into contact with one side of the saws for a sufficient length of time to clean that side, and afterward it is shifted the other way to bring them into contact with the other sides of the saws. The disks have toothed margins $v$, as well as toothed edges $w$, the teeth being mainly in the form of the teeth of milling-tools; but any suitable form of teeth may be used. The mandrel $a$ is geared by a belt, $x$, and pulleys $y$ and $z$ with the arbor $b$ of the gin-saws, and it may be allowed to run continuously, if preferred, as the disks do not interfere with the work of the gin so long as the disks run in the middle of the spaces between the saws.

Having thus described my invention, I claim as new and desire to secure by Letters Patent—

1. In a gin-saw cleaner, the combination, with the endwise-movable shaft and the saw cleaners or disks secured thereon, of the springs mounted on said shaft to maintain the disks about equidistant between the saws, substantially as and for the purpose set forth.

2. In a gin-saw cleaner, the combination, with the endwise-movable shaft and the saw cleaners or disks secured upon said shaft, of the springs mounted on the shaft and the adjustable stops to control the pressure of the disks against the sides of the saws, substantially as and for the purpose set forth.

3. In a gin-saw cleaner, the combination, with the endwise-movable shaft and the toothed cleaners or disks secured upon said shaft, of the vertically-movable bearing-brackets, through which said shaft passes, and the adjusting-screws acting upon said brackets, substantially as and for the purpose set forth.

4. In a gin-saw cleaner, the combination, with the endwise-movable shaft and the cleaners, of the yoke connected to said shaft, and having a rack, the pinion engaging with the latter, and the lever actuating said pinion, substantially as and for the purpose set forth.

5. In a gin-saw cleaner, the combination, with the endwise-movable shaft and the cleaners or disks, of the springs mounted upon said shaft, the yoke connected to the latter, and having a rack, the pinion, and lever actuating said pinion, substantially as and for the purpose set forth.

BENJAMIN R. EATON.

Witnesses:
JAMES H. CALDWELL,
GILBERT COTTRELL.